US007672974B2

(12) United States Patent
Doctorow et al.

(10) Patent No.: US 7,672,974 B2
(45) Date of Patent: Mar. 2, 2010

(54) SYSTEM AND METHOD TO FACILITATE SHARING OF INFORMATION

(75) Inventors: Cory Efram Doctorow, Toronto (CA); Wilson Grad Conn, Toronto (CA); John Douglas Henson, Toronto (CA); Erik Viljo Stewart, Toronto (CA)

(73) Assignee: Northern Light Web Search LLC, Charlestown, MA (US)

( * ) Notice: Subject to any disclaimer, the term of this patent is extended or adjusted under 35 U.S.C. 154(b) by 310 days.

(21) Appl. No.: 10/838,150

(22) Filed: May 4, 2004

(65) Prior Publication Data

US 2005/0131721 A1 Jun. 16, 2005

Related U.S. Application Data

(63) Continuation of application No. 09/571,978, filed on May 16, 2000, now abandoned.

(51) Int. Cl.
*G06F 17/00* (2006.01)

(52) U.S. Cl. .................... 707/104.1; 707/101; 707/102; 707/103 R

(58) Field of Classification Search ............... 707/1-10, 707/100-104.1, 200-206
See application file for complete search history.

(56) References Cited

U.S. PATENT DOCUMENTS

| | | | | |
|---|---|---|---|---|
| 5,619,709 | A | 4/1997 | Caid et al. | |
| 5,754,939 | A | 5/1998 | Herz et al. | |
| 5,796,393 | A | 8/1998 | MacNaughton et al. | |
| 5,907,836 | A | 5/1999 | Sumita et al. | |
| 6,236,991 | B1 | 5/2001 | Frauenhofer et al. | |
| 6,289,337 | B1 | 9/2001 | Davies et al. | |
| 6,289,353 | B1 | 9/2001 | Hazelhurst et al. | |
| 6,347,313 | B1 * | 2/2002 | Ma et al. | 707/3 |
| 6,446,035 | B1 * | 9/2002 | Grefenstette et al. | 704/1 |
| 6,480,885 | B1 | 11/2002 | Olivier | |
| 6,484,162 | B1 * | 11/2002 | Edlund et al. | 707/3 |
| 6,493,702 | B1 | 12/2002 | Adar et al. | |
| 6,519,629 | B2 | 2/2003 | Harvey et al. | |

OTHER PUBLICATIONS

Rose et al., Mar. 1997, "An Intelligent WWW Agent for Similarity-Based Searching"; IEE Colloquium on Intelligent World Wide Web Agents, 1997/118; pp. 7/1-7/6.

Shneiderman, B., Mar. 2000, "Creating Creativity: User Interfaces for Supporting Innovation", ACM Transactions on Computer Human Interaction, vol. 7, No. 1; pp. 114-138.

* cited by examiner

*Primary Examiner*—Isaac M Woo
(74) *Attorney, Agent, or Firm*—Lando & Anastasi, LLP

(57) ABSTRACT

A method and system to facilitate sharing of information amongst users comprises assessing a degree of commonality between each of the users. Once a degree of commonality between the users is assessed, information is shared amongst the users having an assessed degree of commonality greater than a predetermined degree of commonality. In this way, the information being shared is most likely to be useful because it is being shared by users having common traits and characteristics. The degree of commonality can be assessed by comparing areas of interest of the users. The information on the areas of interest may comprise search criteria independently developed by each user to search for information or utilize resources in a network. The degree of commonality may also be assessed by recording each occurrence when a user accepted or did not accept information obtained from each other user.

10 Claims, 7 Drawing Sheets

Figure 3B

Candidate Doc

31

| Word (Wi) | word count | P(word[i] \| candidate) |
|---|---|---|
| at | 1.0000 | 0.0001 |
| Barbie | 1.0000 | 0.0001 |
| BSD | 100.0000 | 0.0137 |
| doll | 100.0000 | 0.0137 |
| Ken | 1.0000 | 0.0001 |
| Linux | 2000.0000 | 0.2739 |
| penguin | 1000.0000 | 0.1369 |
| software | 2000.0000 | 0.2739 |
| the | 100.0000 | 0.0137 |
| UNIX | 2000.0000 | 0.2739 |
| TOTAL | 7303.0000 | |

33i

Ideal Document

| Word[i] | word count | P(word[i] \| ideal) |
|---|---|---|
| at | 1000.0000 | 0.0555 |
| Barbie | 1.0000 | 0.0001 |
| BSD | 1.0000 | 0.0001 |
| doll | 1.0000 | 0.0001 |
| Ken | 1.0000 | 0.0001 |
| Linux | 5000.0000 | 0.2777 |
| penguin | 4000.0000 | 0.2222 |
| software | 3000.0000 | 0.1666 |
| the | 2000.0000 | 0.1111 |
| UNIX | 3000.0000 | 0.1666 |
| | 18004.0000 | |

33j

Junk Document

| Word[i] | word count | P(word[i] \| junk) |
|---|---|---|
| at | 1000.0000 | 0.0769 |
| Barbie | 4000.0000 | 0.3076 |
| BSD | 1.0000 | 0.0001 |
| doll | 2000.0000 | 0.1598 |
| Ken | 3000.0000 | 0.2307 |
| Linux | 1.0000 | 0.0001 |
| penguin | 1.0000 | 0.0001 |
| software | 1.0000 | 0.0001 |
| the | 3000.0000 | 0.2307 |
| UNIX | 1.0000 | 0.0001 |
| | 13005.0000 | |

35

37

| | Bayes Test | | | |
|---|---|---|---|---|
| Word[i] | P(candidate\|ideal) | P(candidate\|junk) | Cross Entropy (ideal) | Cross Entropy (junk) |
| at | 0.0002 | 0.0004 | 0.0000 | 0.0000 |
| Barbie | 0.0006 | 0.0005 | 0.0005 | 0.0005 |
| BSD | 0.0583 | 0.0000 | 0.0019 | 0.0019 |
| doll | 0.0583 | 0.0452 | 0.0471 | 0.0471 |
| Ken | 0.0006 | 0.0005 | 0.0005 | 0.0005 |
| Linux | 0.1524 | 0.0000 | 0.9743 | 0.9743 |
| penguin | 0.0895 | 0.0000 | 0.4739 | 0.4739 |
| software | 0.2131 | 0.0000 | 0.9136 | 0.9136 |
| the | 0.0131 | 0.0476 | 0.0046 | 0.0046 |
| UNIX | 0.2131 | 0.0000 | 0.9136 | 0.9136 |
| | 0.7990 | 0.0942 | 0.2209 | 0.2209 |
| | | | EXCELLENT | POOR |

41

| | User B | User C | User D | User E | ... | User N |
|---|---|---|---|---|---|---|
| **Accept** | 53 | 12 | 41 | 2 | | 7 |
| **Do Not Accept** | 5 | 14 | 13 | 21 | | 1 |
| **Reward** | 7 | 5 | 4 | 0 | | 2 |
| **Punish** | 3 | 6 | 1 | 6 | | 0 |

SYSTEM AND METHOD TO FACILITATE SHARING OF INFORMATION

This application is a continuation application of patent application Ser. No. 09/571,978, filed May 16, 2000, now abandoned the entire content of which is hereby incorporated by reference.

FIELD OF THE INVENTION

This invention relates to a method and device to facilitate sharing of information amongst a group of users connected to a main system. More particularly, the present invention relates to a system and method that determines which users to the system may be able to use information, such as search criteria, offered by other users.

BACKGROUND OF THE INVENTION

Usage of the Internet is becoming increasingly popular. However, as the Internet has gained in popularity, the number of files and Web sites which can be accessed through the Internet has also increased dramatically. This makes it difficult for users to sift through all of the information available on the Internet to locate the information of interest to them. In other words, as more files and Web sites become available on the Internet, it becomes increasingly difficult to locate the files and Web sites which are of interest to the user.

In addition, the files, Web sites, and other services offered on the Internet are continuously changing. This means that it is necessary to periodically review and update the files and Web sites a user may have previously located and accessed on the Internet to keep abreast of these changes.

Typically, a user accesses the Internet from the user's system, which will be referred to as the client computer system. The client computer system generally runs a Web browser which includes software that enables the client computer system to communicate with Web servers on the Internet.

In most cases, a user on the Internet will send a request from the user's client computer to a Web server computer that is located on the Internet. The request identifies a file on the Web server that the user wishes to access. In response to the request from the user, the Web server returns a copy of the file which the user has requested.

In order to assist users in locating information on the Internet that is of interest to them, search engines have been provided to search for key words in files stored on Web servers located on the Internet. Search engines that search across many files on Web sites are sometimes referred to as "spiders". The search engines or spiders gather information regarding the files and store this information in databases that users can search according to key words. Examples of these types of search engines are Lycos and Excite.

However, in order to effectively and efficiently use a search engine it is necessary to enter proper queries into the search engine. For example, if the queries are too narrow, the search may not locate all of the Web pages, which are referred to as "hits", in which the user is interested. Likewise, if the queries are too broad, the search will return a large number of files and Web pages. It is clear that if a large number of hits are returned, then files and Web pages of interest to the user may be buried in a large number of hits of no interest to the user.

Moreover, the Internet is continuously changing. This is the case at least because new files and Web sites are becoming available on the Internet on a daily basis. Furthermore, changes are occurring to existing files and Web sites at an ever-increasing rate. It is clear that the information contained in the files or Web servers on the Internet can change daily or even hourly in some cases. As such, it is important that users have a method and system which can efficiently and effectively locate relevant files and Web sites, not only in the present, but in the future as well.

Accordingly, there is a need in the art for a method and system to permit users to efficiently and effectively locate files and Web sites on the Internet. Moreover, there is a need for a system and method that allows users to obtain information of interest without necessarily developing search criteria.

SUMMARY OF THE INVENTION

Accordingly, it is an object of this invention to at least partially overcome the disadvantages of the prior art. Also, it is an object of this invention to provide an improved system and method that facilitates sharing of information, including search criteria, amongst various users. It is also an object of this invention to provide an improved system and method that assists users in locating files and Web pages on the Internet by sharing information, including search criteria, amongst users who would most likely be interested in each other's search criteria.

Accordingly, in one of its aspects, this invention resides in a method for facilitating sharing of information amongst a group of users of a system, said method comprising the steps of:

(a) obtaining information of interest to one user of the group of users;

(b) determining which of the users in the group of users have information corresponding to the information of interest to the one user;

(c) assessing a degree of commonality of the one user with respect to each other user in the group of users; and providing to the one user information corresponding to the information of interest from users in the group of users having a degree of commonality greater than a predetermined degree of commonality.

In a further aspect, the present invention resides in a system for facilitating sharing of information amongst a group of users connected to the system, said system comprising: a connection to a network for sending and receiving signals to and from said users; a database containing information regarding each user in the group of users; a processor connected to the connection and the database for receiving information from the connection and processing the information in the database; wherein the connection receives information of interest from one user of the group of users and an identifier of the one user; wherein the processor receives the information of interest and the identifier of the one user from the connection and compares information stored in the database regarding the one user to information stored in the database regarding the other users to assess a degree of commonality of the one user with respect to each of the other users in the group; wherein the processor determines which other users in the group of users have information corresponding to the information of interest to the one user; and wherein the processor sends information signals directed to the one user through the connection, said information signals corresponding to the information of interest of the one user from users having a degree of commonality with the. one user greater than a predetermined degree of commonality.

One advantage of the present invention is that it can determine which users would gain a benefit from sharing information amongst each other. The invention accomplishes this in part by identifying commonalities or common areas of interest, and, then permit sharing of information amongst users having these commonalities or common areas of interest, even if their geographic locations are very different. In this way, information will be shared amongst users located in several different locations, but having common areas of interest. Information would also be shared amongst users that are demographically dissimilar but have common areas of interest. This provides an efficient and effective manner of sharing information in that requests for information would be shared amongst users of the system known to have other common areas of interest, but otherwise being dissimilar.

A further advantage of the present invention is that information, including Web sites, e-mail boxes or Usenet newsgroups, can be effectively and efficiently shared between users who have common areas of interest. This can occur even if they may have never met physically and have no direct knowledge of each other.

A still further advantage is that the system and method according to the present invention can continuously re-determine which of the users have areas of interest corresponding to the areas of interest of the other users. In this way, an up-to-date correspondence can be maintained between the users and their areas of interest to efficiently and effectively facilitate sharing of information amongst the users.

In one embodiment, the present invention assesses degrees of commonality between users in the group by maintaining a record of previous information provided to a particular user from another user and whether the provided information was used or discarded. In a still further embodiment, the present invention assesses the degree of commonality between the users in the group by maintaining a record of the frequency with which a user utilizes information, such as search criteria, previously obtained from another user. In this way, the correspondence between the users and their areas of interest can be continuously up-dated.

A still further advantage of the present invention is that it is expandable to include users beyond the immediate subset of users which have common areas of interest with the users. For example, if the method and system cannot locate another user in a first subset of users having information corresponding to the information of interest and some degree of commonality with the user, the method and system will expand to search for users in a second subset of users that have a degree of commonality with the first subset of users and look for information corresponding to the information amongst the second subset of users. If the information corresponding to the inputted information cannot be located amongst the first subset of users having a degree of commonality to the user and the second subset of users having common areas of interest to the first subset of users, the system and method can be expanded to search a third subset and subsequent subsets. The system and method can be further expanded up to the nth subset of users until information corresponding to information of interest is located, the entire group of users has been searched, or a time out occurs.

A still further advantage of the present invention is that the commonality of various users and common areas of interest to the users can be independently determined by the system. For example, the commonality of the users can be determined by reviewing previous queries or search criteria used by each user of the system to locate similarities. In this way, the invention provides the ability to perform a comparison between the user's areas of interest and the areas of interest of others and independently advise a user of information, such as queries or search criteria, which may be of interest to the user.

Another advantage of the present invention is that information, other than search criteria, could be shared amongst users of the system. The other types of information could include availability of resources. For example, a particular user may have found a server on a network that operates particularly quickly. This particular user may share or suggest this information about this server with other users in the group, but it may be most useful to share this information amongst users that have a high degree of commonality. This is the case because the resource, such as the server, may only have availability during certain times of the day or in certain conditions which correspond to the conditions most favourable to the one user. Accordingly, it is most likely that other users of the system will also find that the server is available if the other users have a high degree of commonality to the one user, and therefore use the server at the same time or same conditions. It is understood that the reason a server is available may not necessarily be because it is under-utilized during some periods of the day. There may be a number of reasons as to why a particular resource, such as a server, works particularly well for a particular user, which reasons may not even be known. However, given the apparatus and method according to the present invention, it is not necessary for the particular user to know why the resource has availability when it is utilized by that user. All that is necessary is to know which other users have a high degree of commonality with the particular user, and therefore which other users may also utilize the resource under the same conditions and with the same results.

Further aspects of the invention will become apparent upon reading the following detailed description and drawings which illustrate the invention and preferred embodiments of the invention.

BRIEF DESCRIPTION OF THE DRAWINGS

In the drawings, which illustrate embodiments of the invention:

FIG. 3B is a chart illustrating relevance criteria according to a preferred embodiment of the present invention;

DETAILED DESCRIPTION OF THE PREFERRED EMBODIMENTS

Figure 1:
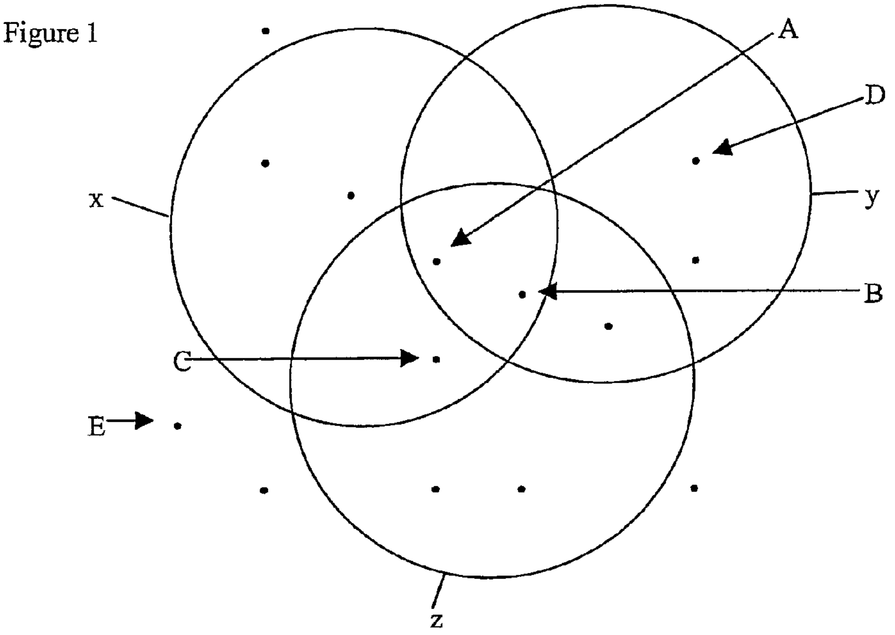
FIG. 1 is a schematic diagram illustrating common areas of interest between users of the system.

FIG. 1 is a venn diagram having three categories or areas of interest represented generally by letters x, y, z. The users A, B, C, D and E of the system are represented in FIG. 1 by dots. While there are a group of several users in FIG. 1 represented by dots, only the dots labelled with reference numerals A, B, C, D, E will be considered for this example.

As illustrated in FIG. 1, user A shares an interest in categories x, y, z. Of the other users B to E illustrated in FIG. 1, user B also has an interest in categories x, y, z. Accordingly, users A and B, based on the information illustrated in FIG. 1, have areas of interest, namely categories x, y, z, that correspond. This is an indication that users A and B have a high degree of commonality. By contrast, user E does not have any common areas of interest corresponding to the areas of interest, namely categories x, y, z, of user A. This is an indication that users A and E have a low degree of commonality.

Accordingly, the degree of commonality between users A, B, C, D and E is an indication that they have similarities. The degree of commonality may also be used to predict if users A, B, C, D and E would benefit from sharing information with each other.

For example, it is likely that user A would gain a greater benefit from sharing information with user B than user E because user A has a higher degree of commonality with user B than with user E. Accordingly, if user A. desired information of interest, it would be more likely that user B would have information corresponding to the information of interest to user A than would user E.

It should be noted that user A and user B may not be aware that they have a high degree of commonality or common areas of interest, such as areas in categories x, y, z. It should also be noted that user A may never have met user B, nor need user A and user B reside in the same geographic location. Moreover, while user A and user B have a high degree of commonality, users A and B may not have any demographic similarities. For instance, user A may be a single male individual in his late thirties and user B may be a married female in her mid-twenties with children. Nevertheless, the high degree of commonality indicated by the common areas of interest illustrated in FIG. 1 suggest that user A and user B would gain a benefit from sharing information with each other.

Figure 2:
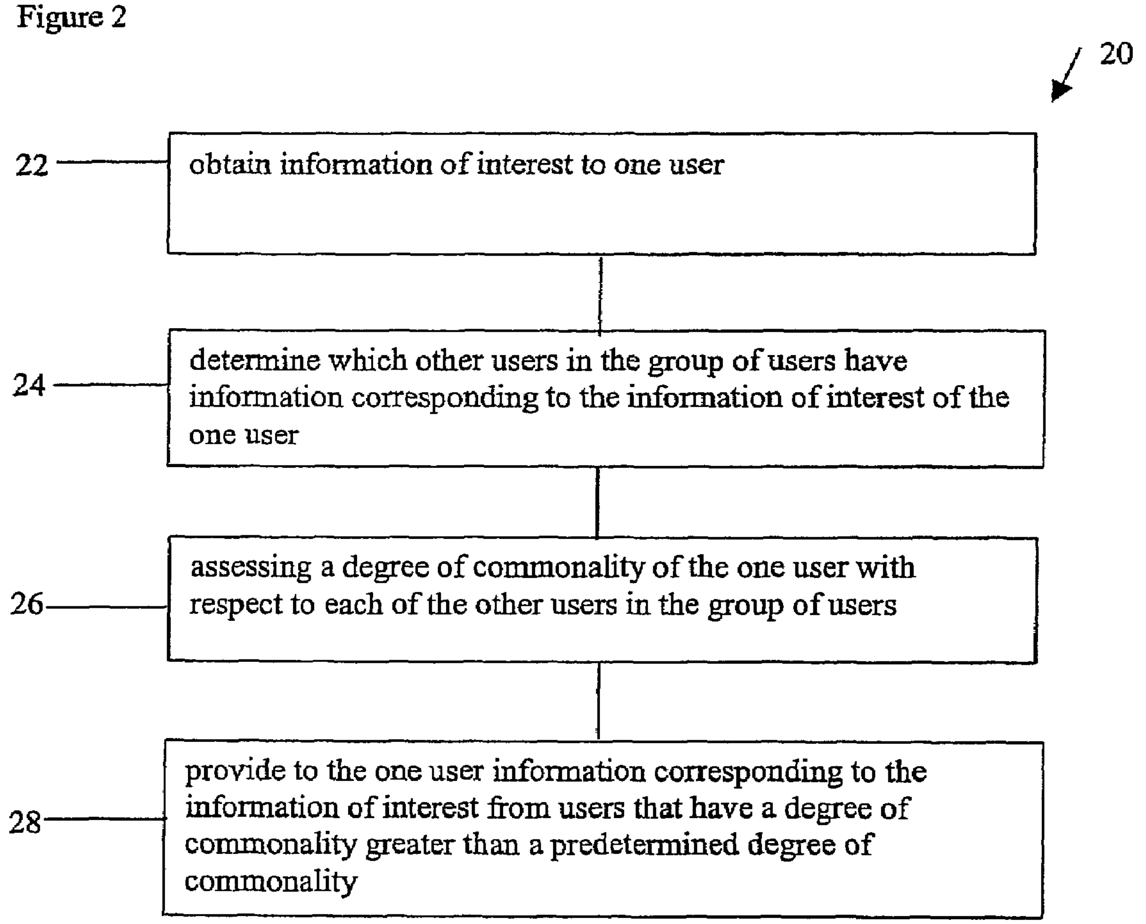
FIG. 2 is a flowchart showing a method according to one embodiment of the present invention.

In order to facilitate sharing of information between the users, such as user A and user B shown in FIG. 1, the method illustrated by flowchart 20 in FIG. 2 may be employed. As illustrated in FIG. 2, the first step 22 is to obtain information in which one of the users, in this example user A, is interested. The information of interest to user A can be obtained in any way. For example, user A may input the information through an input/output device. Alternatively, information of interest to user A could be inferred automatically by monitoring queries made by user A over time.

The next step 24 in the flowchart 20 in FIG. 2 is to determine what other users B to E in the group of users have information corresponding to the information of interest to user A. For example, if user A is interested in sports utility vehicles, a search can be made of information that the other users B to E have regarding this information of interest to user A.

The third step 26 in the flowchart 20 in FIG. 2 is to assess the degree of commonality of users A to E in the group of users. The degree of commonality between users A to E may be assessed in a number of ways. In one embodiment, step 26 of assessing the degree of commonality between users A to E involves a determination of whether or not user A has any common areas of interest corresponding to any of the other users B to E.

For example, with reference to FIG. 1, user B would have several areas of interest corresponding to the areas of interest of user A, such as categories x, y, z. User C shares areas of interest, namely categories x and y, with user A. As also illustrated in FIG. 1, user D has one area of interest, namely category y, with user A. However, user E does not have any areas of interest with user A. In this embodiment, an assessment of the degree of commonality between users A to E may be made in this embodiment based on their common areas of interest. For example, because users A and B share common areas of interest in categories x, y, z, users A and B would have a high degree of commonality. Likewise, user C would have a relatively high degree of commonality with user A as user A and user C have categories x and z as common areas of interest. By contrast, user D would likely have less commonality with user A as user D only shares one area of interest with user A. User E would have a very low degree of commonality with user A as user E shares no common areas of interest with user A.

It is noted that steps 24 and 26 of flowchart 20 in FIG. 2 need not be performed in any particular order, nor at the same time. Moreover, it is possible that steps 24 and 26 could be previously performed by recording information regarding users A to E to permit quick comparison when needed. In any event, once steps 24 and 26 have been completed, information corresponding to the information of interest to user A can then be provided at step 28.

The information provided will preferably be from users having a degree of commonality greater than a predetermined degree of commonality and from users that have information corresponding to the areas of interest to user A. When commonality is measured by the areas of interest, it is clear that user B would have the highest degree of commonality with user A, and therefore information corresponding to the information of interest from user B would be provided. If other users C to E also have information of interest to user A and a degree of commonality above a predetermined degree of commonality, then their information would also be provided. For example, if user C had information corresponding to the information of interest to user A, then that information would be provided from user C.

Preferably, if information from both users B and C is provided to user A, the information would be provided in an order corresponding to the degree of commonality. For example, the information from user B would be provided first in order as user A has a higher degree of commonality with user B than with user C. Whether or not user E had information corresponding to information of interest to user A, this information would not be provided because user E has a very low degree of commonality with user A. In other words, the information from user E would not be considered to be of any benefit to user A, and therefore would not be provided.

Step 24 in flowchart 20, namely determining which other users B to E in the group of users have information corresponding to the information of interest of user A, can be accomplished in a number of ways. In a preferred embodiment, this can be accomplished by searching information available from each of the other users B to E to determine if any of the information the other users B to E have information of interest to user A. In other embodiments, users B to E may offer information for use by others for a fee.

The step 26 of assessing which users A to E in the group of users have a high degree of commonality with other users A to E in the group of users, can be performed in a number of ways. For example, information about users A to E can be compared to determine whether or not users A to E have common areas of interest, thereby assessing the degree of commonality amongst the users A to E as described above. Information about the users A to E that may be compared can be any type of information relating to the users A to E. For example, the information may relate to documents, files, or Web pages that users A to E may have accessed in the past from a network, such as the Internet I or other sources. The information may also include search criteria each user A to E utilizes to independently search for information of interest. For example, if users A and B both have search criteria regarding categories x, y, z, a determination can be made that the users A and B have areas of interest in categories x, y, z. Furthermore, more detailed information regarding the search criteria, such as a comparison of the relevance criteria between users A and B, may be made to provide a more detailed assessment of the commonality between users A and B, or any other users A to E in the group of users.

Figures 4A, 4B:
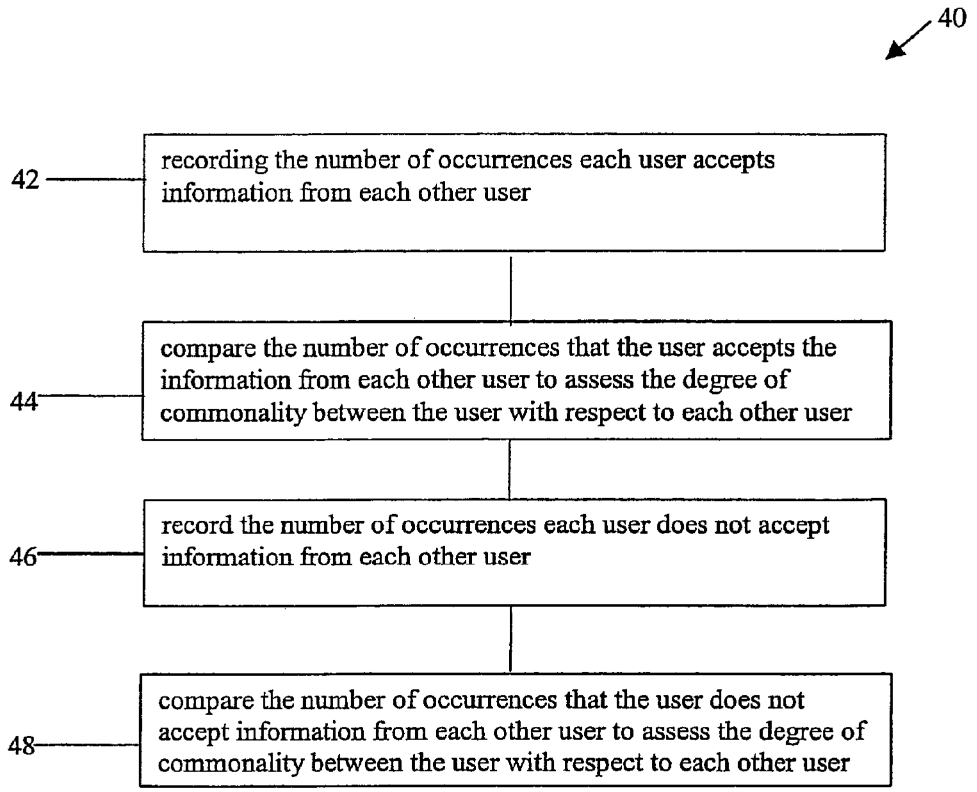
FIG. 4A is a flowchart of a subroutine according to a preferred embodiment of the present invention.
FIG. 4B is a table illustrating the type of information recorded for each user that is compared to assess the degree of commonality.

In a further preferred embodiment, step 26 of assessing the degree of commonality between users B to E in the group of users comprises the substeps set out in flowchart 40 in FIG. 4A. As shown in FIG. 4A, the degree of commonality is assessed by maintaining a record of the number of occurrences each user A to E accepts information from each other user A to E.

In other words, if user A was previously provided with information from user B and user A accepted the information from user B, a record of this occurrence could be made at step 42. The number of such occurrences would be recorded and used in the future to assess the degree of commonality between user A and user B at step 44. Likewise, at step 46 a record is made of the number of occurrences each user does not accept information from each other user. A comparison of this information can be made at step 48 to assess the degree of commonality. For example, as illustrated in table 41 in FIG. 4B, a record may be kept of each occurrence user A accepts or does not accept information from each of the other users B to E. The other users B to E are illustrated in the columns and could go up to any user N.

In the example illustrated by table 41 in FIG. 4B, user A has accepted information from user B 53 times, but has only accepted information from user E twice. User A has not accepted information from user B only five times, while user A has not accepted information from user E 21 times. From a comparison of the numbers illustrated in table 41 in FIG. 4B, it is clear that user A will be deemed to have a high degree of commonality with user B. However, user A would be assessed to have a very low degree of commonality with user E. Each time user A accepted or denied information from any one of the other users, table 41 in FIG. 4B would be updated to reflect this. A table similar to table 41 in FIG. 4B may be maintained for each of the other users A to E to record occurrences of acceptance and non-acceptance from the other users B to E.

This is significant in that, even if it is determined from other methods that user A and user C have several common areas of interest, such as categories x and z, if user A repeatedly does not accept information provided by user C, the degree of commonality between user A and user C will be assessed downwards. Accordingly, a comparison of the common areas of interest for users A to E is a good first approximation of the degree of commonality between users A to E. However, as users A to E begin to accept and not accept information from users A to E, the method illustrated in FIG. 4A can be used to provide a more accurate reflection of the degree of commonality between the users A to E.

It is apparent that the records of information accepted and not accepted may be kept automatically. In addition to these records that are kept automatically, user A may choose to reward or punish particular information that was used. This is illustrated in the rows labelled as "reward" and "punish" in table 41. Table 41 illustrated in FIG. 4B will be updated each time user A rewards information received from user B. For example, user A has rewarded information received from user B seven times and punished information received from user B three times. In this way, in addition to the automatic record keeping of the number of times information is accepted and not accepted, the users A to E may also supplement this automatic record by actively "rewarding" and "punishing" particular information received.

Accordingly, with a comparison of the information shown in table 40, an assessment of the degree of commonality may be made. The assessment of commonality can be made in different ways using this information. In one embodiment, the degree of commonality can be made by simply subtracting the occurrences of acceptance from the occurrences that were not accepted. On this basis, the degree of commonality between user A and user B would be (53−5=) 48, the degree of commonality between user A and user C would be (12−14=)−2, the degree of commonality between user A and user D would be (41−13=) 28, and the degree of commonality between user A and user E would be (2−21=)−19. This can be made for all of the users from which user A has either accepted or not accepted information up to user N. Information of interest may be provided from users that have a degree of commonality greater than a predetermined degree of commonality, which would be any predetermined degree, such as zero. Accordingly, each of the users that have a positive degree of commonality, including user B, user D and user N, in this embodiment would be provide information to user A.

The values for reward and punish can be incorporated into the above calculation to more accurately assess the degrees of commonality. For example, for user B, the rewards may be subtracted from the punishment to provide the value (7−3=) 4. This value could be added to the other value determined from the number of acceptances and the number of non-acceptances. Similar calculations can be made for each of the other users in the embodiment where rewards and punishments are used.

The information stored in table 40 is time sensitive because the interests of the users A to E may change over time. To reflect this, the value in table 40 preferably begins to move towards zero if one user, such as user A, has not accepted or rewarded information from another user, such as user B, for a predetermined period of time, such as 30 days.

The substeps illustrated in FIG. 4*a* by flowchart 40 can be useful if no previous record of areas of interest between users A to E has been made. For example, with reference to FIG. 1, if there is a large number of occurrences recorded of user A accepting information from user D, then user A and user D will be assessed to have a high degree of commonality, even though user D is only known to share one area of interest, namely category y, with user A. This can be used, for instance, to automatically suggest to user D information related to categories x and z, based on the assumption that because user D has a high degree of commonality with user A, user D may find categories x and z of interest.

Figure 3A:
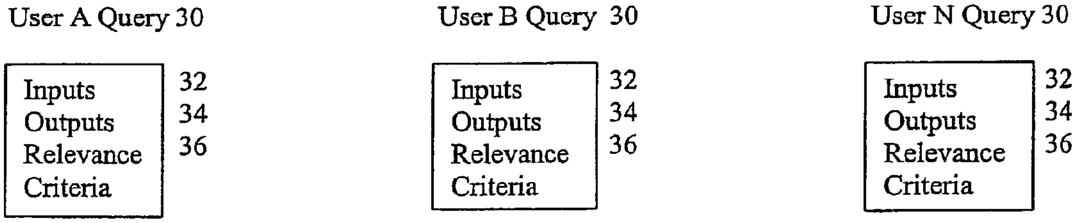
FIG. 3A is a symbolic diagram illustrating different queries users of the invention may utilize.

In a preferred embodiment, the information of interest will correspond to search criteria each user A to E utilizes to search for information of interest. For example, the search criteria could comprise queries 30, as illustrated in FIG. 3*a*. The search queries 30 could be simple terms used to perform searches. In addition, the search queries 30 could be more complex queries comprising inputs 32, outputs 34, and relevance criteria 36, as illustrated in FIG. 3*a*. For example, the inputs 32 could comprise a list of files, Web sites, e-mail boxes, or Usenet newsgroups which have been determined to contain information of interest to the query 30. The outputs 34 would be devices that receive relevant documents from the query 30. In other words, the outputs 34 could include a mailbox, a pager, a facsimile machine, voice mail, a directory on a hard drive or a portion of a Web page listing the most relevant Web pages located from the search. In other words, the outputs 34 can specify any type of device or a means that can receive information located by the query 30.

The relevance criteria 36 comprises criteria or tests that can be used to determine whether or not the inputs 32 are relevant to the users A to E. For example, the relevance criteria 36 can comprise key words and kill words, the presence of which would indicate whether or not the document is relevant to the users A, B, C, D and E.

The relevance criteria 36 can also include more complex forms of determining whether or not the information located by the query 30 is relevant, such as histograms 33*i*, 33*j*, as illustrated in FIG. 3B. The histograms 33*i*, 33*j* illustrated in FIG. 3B show the probability or percentage of occurrence of words in an ideal document (33*i*) and a non-ideal or junk document (33*j*) for the corresponding user. The ideal document histogram 33*i* comprises a record of the number of occurrences of specific words in documents that each user, such as user A, has found of interest and relevance. The junk document histogram 33*j* comprises a record of the number of occurrences of specific words in documents that user A has found not of interest and not of relevance.

The histograms 33*i*, 33*j* can be used to analyze documents, such as candidate document 31, by means of a Bayes test 35 as is known in the art. Cross entropy (ideal) and cross entropy (junk) shown in table 37 in FIG. 3B can then be calculated to determine whether or not the candidate document is more like the ideal document or the junk document. An analysis can then be made as to whether or not the candidate document 31 is relevant to the user A. Further, the histograms 33*i*, 33*j* of each user A to E can be used to determine the areas of interest of the users A to E. This can be done, for example, by comparing the words in the ideal document histogram 33*i* and the junk document histogram 33*j* between each user A to E.

Search query 30 incorporating histograms 33*i*, 33*j* can also be shared amongst the users A to E as information corresponding to information of interest. For example, if user A is interested in sports utility vehicles and user B has a query 30 for sports utility vehicles, then user B may provide this search query 30 to user A. If user B's search query 30 includes an ideal document histogram 33*i* and a junk document histogram 33*j*, these will also be provided with the search query 30.

Accordingly, the search queries 30 are essentially types of robots generated by each of the users A, B, C, D, E to search for and locate files and other information of interest to the individual users A to E. In the embodiment where the search queries 30 are designed to search for information on the Internet I, the located information could include Web pages and other files residing on Web servers located on the Internet I.

In the embodiment where the information of interest to user A is a search query 30 on a specific subject, a search will be made to determine if any of the other users B to E have a search query 30 corresponding to the search query 30 of user A. For example, if the information of interest to user A is a search query 30 to locate information for sports utility vehicles, then a search would be performed to determine which other users B to E in the group of users have queries 30 for sports utility vehicles. If user B has a query 30 for sports utility vehicles and user B has a degree of commonality above a predetermined degree of commonality with user A, then the query 30 of user B for sports utility vehicles will be provided to user A.

It is of course possible that none of the users that have a degree of commonality greater than a predetermined degree of commonality with respect to user A may not have information corresponding to the information of interest to user A. In this event, the subroutine illustrated by flowchart 50 in FIG. 5A may be utilized.

Figure 5A:
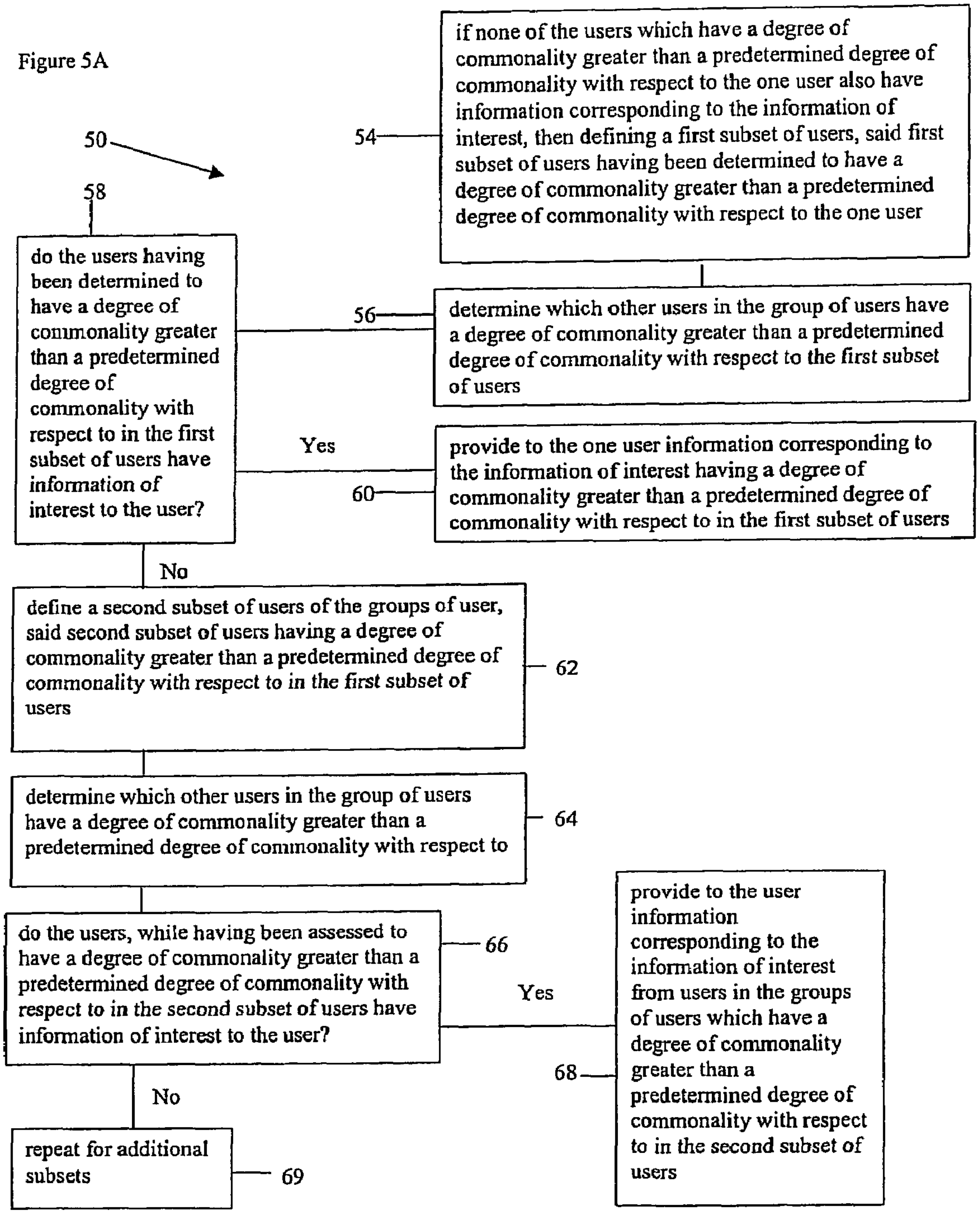
FIG. 5A is a flowchart illustrating a preferred subroutine according to one embodiment of the present invention.
Figure 5B:
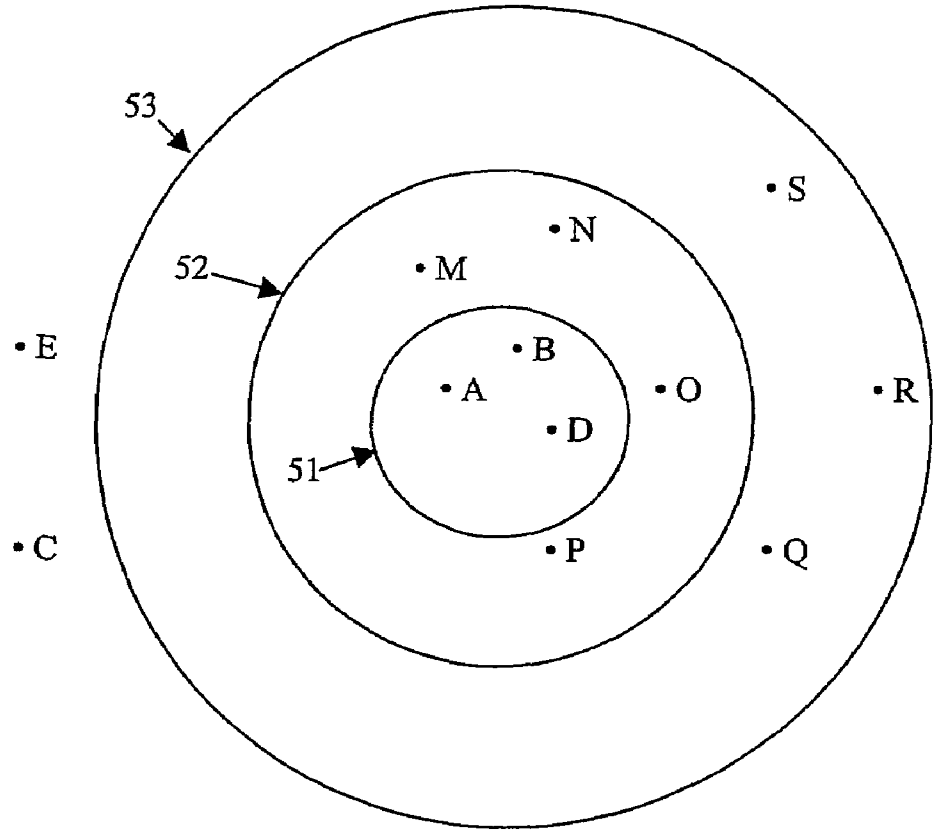
FIG. 5B is a schematic diagram illustrating operation of the subroutine shown in FIG. 5A.

As shown in FIG. 5A, the first step 54 in the flowchart 50 is to define a first subset of users that have a degree of commonality greater than a predetermined degree of commonality with respect to the users A to E, in this example user A. The first subset of users is illustrated in FIG. 5B by the circle 51 encompassing users A, B and D, users B and D having a degree of commonality greater than a predetermined degree of commonality with respect to user A.

Step 56 in flowchart 50 determines which users of the group of users have a degree of commonality greater than a predetermined degree of commonality with respect to the first subset of users 51, in this embodiment users A, B and D. In this example, users M, N, O and P are considered to have a degree of commonality greater than a predetermined degree of commonality with the users in the first subset of users 51. In step 58, a determination is made as to whether or not this second subset of users 52 comprising users M, N, O, P, who have been determined to have a degree of commonality greater than a predetermined degree of commonality with respect to the first subset of users 51 comprising users A, B and D, have information of interest to user A. If they do, then in step 60, this information is provided to user A. If none of users M, N, O, P have information of interest to user A, the flowchart 50 proceeds to step 62 where a second subset of users 52 is defined, the second subset of users 52 having been determined to have a degree of commonality greater than a predetermined degree of commonality with respect to the first set of users 51. In other words, the second set of users 52 in this case would be the users encompassed within circle 52 in FIG. 5B.

Steps 64, 66 and 68 are then performed with respect to the second subset of users 52, similar to steps 56, 58 and 60 with respect to the first subset of users 51. Accordingly, a determination will be made as to which other users in the group of users have a degree of commonality greater than a predetermined degree of commonality with respect to the second subset of users 52, which is illustrated in FIG. 5B by users Q, R, S within circle 53. In step 66, an assessment is made as to whether or not users Q, R, S have the information of interest to user A. If they do, this information is provided to user A. If they do not, the process is repeated for additional subsets, in this case the users defined by the third subset 53.

The subroutine illustrated by flowchart 50 can be repeated for any number of subsets. Clearly, the number of users within each subset of users will increase until the information of interest to user A is located, or, all of the users in the group of users have been searched. However, it is apparent that the subroutine illustrated by flowchart 50 in FIG. 5A may require a great deal of computational resources. Accordingly, it is preferred that a timeout situation is set, which may occur to end the subroutine so as not to expend excessive amounts of resources on an individual search. The timeout could vary depending on the overall-demands being made at any particular time.

Figure 6:
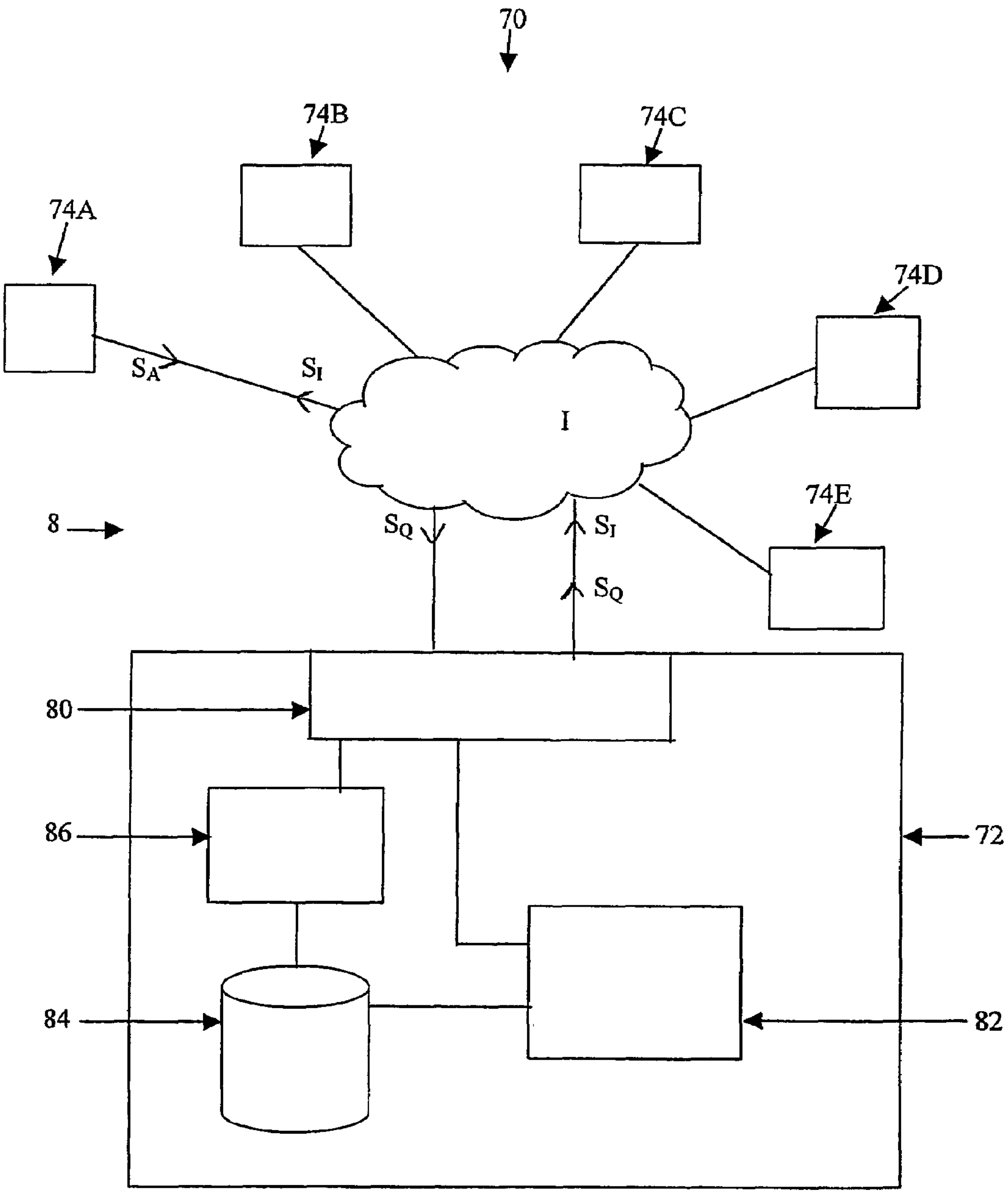
FIG. 6 is a schematic diagram illustrating a system according to one embodiment of the present invention.

FIG. 6 illustrates a network, shown generally by reference numeral 8, in which the present invention may operate. As shown in FIG. 6, in a preferred embodiment, the network 8 is the Internet I, however it is understood that the invention is not restricted to use with the Internet I, but rather can be used in any type of network 8.

Connected to the network 8 is a plurality of client computer systems 74A, 74B, 74C, 74D, 74E. The reference numeral 74 will be used to refer to the plurality of computer systems as a whole. However, each client computer system 74 will be operated or associated with a particular user, such as users A, B, C, D, E, which is illustrated in FIG. 6 by each computer system 74 being identified by the specific reference numeral 74A, 74B, 74C, 74D, 74E.

The network 8 may also be connected to a number of other computer systems and servers (not shown). For example, if the network 8 is the Internet I, then there may be several million Web servers connected to the Internet I, each Web server with a number of files that could be accessed by any one of the users A to E. In addition, it would be possible to identify each of the files on the Internet I by means of a Uniform Resource Locator (URL).

The plurality of client computer systems 74 will generally comprise the elements that are required to connect to the network 8 and send to and receive information and signals through the network 8. In particular, the plurality of client computer systems 74 will comprise a connection to the network 8 for sending and receiving signals, a processor, memory for storing information and some type of output device, such as a printer, video monitor or other output devices. In the embodiment where the network 8 is the Internet I, the plurality of client computer systems 74 will also comprise a Web browser.

As also shown in FIG. 6, a primary computer system 72 is connected to the network 8. The primary computer system 72 comprises a connection 80 to connect the primary computer system 72 to the network 8. The primary computer system 72 also comprises a database 84 for storing information. The primary computer system 72 also comprises a processor 82 to process information.

In a preferred embodiment, the primary computer system 72 can also be used by users A to E to search for information on the network 8. To accomplish this, the primary computer system 72, in one embodiment, comprises a search engine 86 which may be connected to the connection 80 and the database 84. The search engine 86 may be combined with the processor 82 to form a single unit.

The search queries 30, including the inputs 32, outputs 34 and relevance criteria 36, may be stored in the database 84, as well as on the corresponding plurality of client computer systems 74 of the corresponding user A to E. Furthermore, the processor 82 can be programmed and configured to execute the methods referred to above and illustrated in FIGS. 2, 4A and 5A.

In other words, the processor 82 will obtain information of interest to one of the users, such as user A, by user A inputting the information through the computer system 74A of user A. The computer system 74A of user A will send a signal $S_A$ indicative of the information of interest to user A and identifying user A. The signal $S_A$ will be received by the connection 80 of the primary computer system 72. The processor 82, connected to the connection 80, will receive the information of interest from user A and determine which other users in the group of users have information corresponding to the information of interest to user A. This can be done, for example, by the processor 82 comparing the information stored in the database 84. The processor 82 will then assess a degree of commonality of the one user A with respect to each of the other users B to E in the group of users. If information corresponding to the information of interest of user A is located from a user having a degree of commonality greater than a predetermined degree of commonality, that information will be provided to user A by information signal $S_I$ sent by the connection 80. Otherwise, the subroutine illustrated by flowchart 50 will be executed by processor 82.

Processor 82 may assess the degree of commonality between the users A to E in a number of ways. In particular, the processor 82 may utilize the specific methods described above and illustrated in FIGS. 1 and 4A. For example, the processor 82 may assess the degree of commonality between the users by comparing the queries 30 and relevance criteria 36 of each of the users that may be stored in the database 84. If this information is not stored in database 84, the processor 82 may send signals $S_Q$ through connection 80 to the client computer system 74 to determine this information.

Furthermore, each time processor 82 provides information to one of the users A to E, processor 82 may make a record in database 84 of whether or not the information is accepted or not accepted. Likewise, the processor 82 will maintain a record each time one of the users "rewards" or "punishes" information previously obtained from one of the users. In other words, the processor 82 will record information for each user, similar to the information illustrated in table 41 in FIG. 4B.

Accordingly, the database 84 may contain information regarding each user in the group of users which the processor 82 will compare to assess the degree of commonality. The information contained in the database 84 may include information corresponding to information in table 41 in FIG. 4B for each user A to E and information corresponding to search queries 30, including histograms 33*i* and 33*j*, as shown in FIGS. 3A and 3B, to assess the degree of commonality between the users A to E.

It is preferred that the primary computer system 72 has a search engine 86 so that each of the users A to E utilize the primary computer system 72 to perform searches on the network 8. In this way, the primary computer system 72 may record in database 84 each of the search queries and maintain them for future reference and to assess the degree of commonality between the users.

If processor 82 identifies users, such as users A and D, who may have a high degree of commonality, although they do not have areas of interest that correspond, the processor 82 may also automatically send a signal to the users A and D suggesting information, such as search queries 30, utilized by the other user A and D. The processor 82 may also begin to discount the information stored in database 84 over time if there is no activity between two particular users, such as user A and user B. For example, if user A stops accepting or rewarding information from user B for 30 days or more, the processor 82 may begin to decrease the values stored in user B's column in table 41. This will reflect user A's interests are changing.

It is understood that reference to information can include any type of information. While in a preferred embodiment, the information may comprise search queries 30 for searching for information in the network 8, the information is not limited to search queries 30. Rather, the information could include any type of information that may be relevant to users A to E. In a preferred embodiment, the information relates to availability of resources in the network 8 such that user A may have information of interest as to when a particular resource on the network 8 is available. In this case, it would be advantageous to provide this information from another user that has a high degree of commonality with user A on the basis that the user having the high degree of commonality will also utilize resources during conditions when they are most available.

It is understood that the present invention is not limited to a particular group of users, such as users A to E. Rather, the-present invention can be used with any groups of users and any size.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments which are functional, electrical or mechanical equivalents of the specific embodiments and features that have been described and illustrated herein.

The embodiments of the invention in which an exclusive property or privilege is claimed are defined as follows:

1. A method for facilitating sharing of information amongst a group of users of a computer system, the computer system including at least one input, at least one output and one or more processors coupled to the input and the output, said method comprising the steps of:

(a) obtaining, via the at least one input, information of interest to one user of the group of users in order to define one or more areas of interest of the one user;

(b) determining, by at least one of the one or more processors, if any of the users in the group of users have information corresponding to the information of interest to the one user, and if so which users;

(c) assessing, by at least one of the one or more processors, a degree of commonality of the one user with respect to each other user in the group of users;

(d) providing, via the at least one output to the one user, information corresponding to the information of interest from users in the group of users having a degree of commonality greater than a predetermined degree of commonality;

(e) if the users having a degree of commonality greater than a predetermined degree of commonality do not have information of interest to the user, defining a first subset of users of the groups of users, said first subset of users having been determined to have a degree of commonality greater than a predetermined degree of commonality;

(f) determining which other users in the group of users have a degree of commonality with respect to the users in the first subset of users greater than a predetermined degree of commonality; and (g) providing to the one user information corresponding to the information of interest from users in the groups of users which have a degree of commonality with respect to the users in the first subset of users greater than a predetermined degree of commonality.

2. The method as defined in claim 1, wherein step (b) includes determining those users in the group of users that have one or more areas of interest in common with any areas of interest of the one user; and wherein step (c) assessing, by at least one of the one or more processors, a degree of commonality of the one user with respect to each other user in the group of users comprises the step of (c1) determining the number of areas of interest that other users in the group of users have corresponding to the areas of interest of the one user.

3. The method as defined in claim 2, wherein step (c1) of determining which other users in the group of users have areas of interest corresponding to the areas of interest of the one user comprises the step of (c2) comparing information about the one user to information about other users in the group of users; and wherein the information about the user and the other users comprises search criteria each user utilizes to independently search for information of interest.

4. The method as defined in claim 3, wherein the search criteria comprises key words and kill words; and wherein the step (c2) of comparing information about the user to information about other users comprises the step (c3) of comparing the key words and kill words of the user to the key words and kill words of the other users.

5. The method as defined in claim 3, wherein the search criteria comprises histograms of documents; and wherein the step (c1) of comparing information about the user to information about other users comprises the step (c2) of comparing the histograms of documents of the user to the histograms of documents of the other users.

6. The method as defined in claim 1, wherein step (c) assessing, by at least one of the one or more processors, a degree of commonality of the one user with respect to each other user in the group of users comprises the steps of:

(c1) recording a number of occurrences that the user accepts information from each other user; and (c2) comparing the number of occurrences that the user accepts information from the other users.

7. The method as defined in claim 6, wherein step (c) assessing, by at least one of the one or more processors, a degree of commonality of the one user with respect to each other user in the group of users comprises the steps of:

(c3) recording a number of occurrences the user does not accept information from each other user; and (c4) comparing the number of occurrences the user does not accept information from the other users.

8. The method as defined in claim 6 further comprising the step of (d1) providing to the one user information corresponding to the information of interest from users in the group of users which have a degree of commonality greater than a predetermined degree of commonality in an order corresponding to the number of occurrences the user accepted information from each other user.

9. The method as defined in claim 1 further comprising the steps of:

(h) if the users having a degree of commonality with respect to the first subset of users greater than a predetermined degree of commonality do not have information of interest to the user, defining a second subset of users of the groups of users, said second subset of users having been determined to have a degree of commonality with respect to the first subset of users greater than a predetermined degree of commonality;

(i) determining which other users in the group of users have a degree of commonality with respect to the users in the second subset of users greater than a predetermined degree of commonality; and (j) providing to the one user information corresponding to the information of interest from users in the groups of users which have a degree of commonality with respect to the user in the second subset of users greater than a predetermined degree of commonality.

10. The method as defined in claim 1 further comprising the step of (e) displaying to the one user information corresponding to the information of interest to the one user in an order corresponding to the degree of commonality of the user from whom the information is provided.

* * * * *